United States Patent
Axmon et al.

(10) Patent No.: US 10,506,557 B2
(45) Date of Patent: *Dec. 10, 2019

(54) DECODING MARGIN BASED CONFIGURATION OF TRANSMISSION PROPERTIES

(71) Applicant: Telefonaktiebolaget LM Ericsson (publ), Stockholm (SE)

(72) Inventors: Joakim Axmon, Malmo (SE); Peter Alriksson, Horby (SE); Niklas Andgart, Sodra Sandby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 56 days.

This patent is subject to a terminal disclaimer.

(21) Appl. No.: 15/554,708

(22) PCT Filed: Mar. 5, 2015

(86) PCT No.: PCT/EP2015/054614
§ 371 (c)(1),
(2) Date: Aug. 30, 2017

(87) PCT Pub. No.: WO2016/138958
PCT Pub. Date: Sep. 9, 2016

(65) Prior Publication Data
US 2018/0242280 A1    Aug. 23, 2018

(51) Int. Cl.
*H04W 72/04* (2009.01)
*H04W 24/02* (2009.01)
(Continued)

(52) U.S. Cl.
CPC .......... *H04W 72/04* (2013.01); *H04L 1/0001* (2013.01); *H04L 1/004* (2013.01); *H04L 1/0061* (2013.01);
(Continued)

(58) Field of Classification Search
CPC ... H04L 1/0001; H04L 1/1812; H04L 1/0061; H04L 1/203; H04L 1/004; H04L 41/0823;
(Continued)

(56) References Cited

U.S. PATENT DOCUMENTS 7,564,827 B2    7/2009  Das et al.
9,722,727 B2 *  8/2017  Andgart ............... H04B 7/0456
(Continued)

FOREIGN PATENT DOCUMENTS

EP    1633069 A1    3/2006
EP    2166689 A1    3/2010
(Continued)

OTHER PUBLICATIONS

Japanese Office Action, dated Aug. 7, 2018, in connection with Japanese Application No. 2017-546640, 3 pages.
(Continued)

*Primary Examiner* — Joshua Kading
(74) *Attorney, Agent, or Firm* — Leffler Intellectual Property Law, PLLC

(57) ABSTRACT

The present disclosure relates to methods of configuring transmission properties in a radio network node. More particularly the disclosure pertains to configuring transmission properties based on a successful decoding of one or more transport blocks. The disclosure also relates to methods of configuring transmission properties in the uplink and in the downlink and to corresponding radio network node and computer program. According to some aspects, the disclosure proposes a method, performed in a radio network node that is communicating with a wireless device, of configuring transmission properties. The method comprises obtaining information indicative of a decoding margin of a successful decoding of a first transport block transmitted, using a set of transmission properties, between the radio
(Continued)

network node and the wireless device and reconfiguring the transmission properties to be used for further transmissions between the radio network node and the wireless device, based on the obtained information indicative of a decoding margin.

34 Claims, 7 Drawing Sheets

(51) Int. Cl.
| | |
|---|---|
| *H04L 12/24* | (2006.01) |
| *H04L 1/00* | (2006.01) |
| *H04W 24/08* | (2009.01) |
| *H04W 16/10* | (2009.01) |
| *H04W 28/06* | (2009.01) |
| *H04W 28/02* | (2009.01) |
| *H04L 1/18* | (2006.01) |
| *H04L 1/20* | (2006.01) |

(52) U.S. Cl.
CPC ............ *H04L 1/1812* (2013.01); *H04L 1/203* (2013.01); *H04L 41/0823* (2013.01); *H04W 16/10* (2013.01); *H04W 24/02* (2013.01); *H04W 24/08* (2013.01); *H04W 28/0273* (2013.01); *H04W 28/06* (2013.01)

(58) Field of Classification Search
CPC ............... H04L 12/1863; H04L 12/189; H04L 29/08459; H04L 67/1076; H04W 24/02; H04W 24/08; H04W 28/0215; H04W 28/0231–0263; H04W 28/0273; H04W 28/0284; H04W 28/0289; H04W 28/06; H04W 28/10; H04W 16/10; H04W 72/04; H04W 72/12
See application file for complete search history.

(56) References Cited

U.S. PATENT DOCUMENTS

| | | | |
|---|---|---|---|
| 2002/0046379 | A1 | 4/2002 | Miki et al. |
| 2002/0178417 | A1 | 11/2002 | Jacob et al. |
| 2004/0228320 | A1 | 11/2004 | Laroia et al. |
| 2007/0049207 | A1 | 3/2007 | Haghighat et al. |
| 2011/0004796 | A1 | 1/2011 | Hsuan et al. |
| 2011/0103323 | A1* | 5/2011 | Wang .................... H04L 1/0026 370/329 |
| 2011/0276851 | A1 | 11/2011 | Nagaraja |
| 2013/0166983 | A1 | 6/2013 | Graumann |
| 2013/0182582 | A1 | 7/2013 | Bontu et al. |
| 2013/0294357 | A1 | 11/2013 | Shimanuki et al. |
| 2015/0078270 | A1 | 3/2015 | Seo et al. |
| 2016/0056912 | A1 | 2/2016 | Froc et al. |

FOREIGN PATENT DOCUMENTS

| | | | |
|---|---|---|---|
| EP | 2383924 | A1 | 11/2011 |
| EP | 2663007 | A1 | 11/2013 |
| JP | 1079724 | A | 3/1998 |
| JP | 2001156711 | A | 6/2001 |
| JP | 2004201002 | A | 7/2004 |
| JP | 2005176205 | A | 6/2005 |
| JP | 2006211017 | A | 8/2006 |
| JP | 2009017587 | A | 1/2009 |
| JP | 2012531774 | A | 12/2012 |
| JP | 2014505386 | A | 2/2014 |
| WO | 2004075023 | A2 | 9/2004 |
| WO | 2006095398 | A1 | 9/2006 |
| WO | 2007062754 | A1 | 6/2007 |
| WO | 2009098981 | A1 | 8/2009 |
| WO | 2011140398 | A1 | 11/2011 |
| WO | 2013162867 | A1 | 10/2013 |

OTHER PUBLICATIONS

English language translation of Summary of Japanese Office Action, dated Aug. 7, 2018, in connection with Japanese Application No. 2017-546640, 1 page.

Japanese Office Action, dated Sep. 4, 2018, in connection with Japanese Application No. 2017-546638, 4 pages.

English language translation of Summary of Japanese Office Action, dated Sep. 4, 2018, in connection with Japanese Application No. 2017-546638.

PCT International Search Report, dated May 15, 2015, in connection with International Application No. PCT/EP2015/054614, all pages.

PCT Written Opinion, dated May 15, 2015, in connection with International Application No. PCT/EP2015/054614, all pages.

3GPP TS 36.213, V10.12.0 "Evolved Universal Terrestrial Radio Access (E-UTRA); Physical layer procedures (Release 10)" Mar. 2014, Sections 7.1.7.1 and 7.2.3, pp. 1-5, 33-34, 63-66.

PCT International Search Report, dated Nov. 19, 2015, in connection with International Application No. PCT/EP2015/054612, all pages.

Indian Office Action, dated Oct. 15, 2019 in connection with Indian Application No. 20177031265, 5 pages.

* cited by examiner

DECODING MARGIN BASED CONFIGURATION OF TRANSMISSION PROPERTIES

TECHNICAL FIELD

The present disclosure relates to methods of configuring transmission properties in a radio network node. More particularly the disclosure pertains to configuring transmission properties based on a successful decoding of one or more transport blocks. The disclosure also relates to methods of configuring transmission properties in the uplink and in the downlink and to corresponding radio network node and computer program.

BACKGROUND

The 3rd Generation Partnership Project, 3GPP, is responsible for the standardization of the Universal Mobile Telecommunication System (UMTS) and Long Term Evolution, LTE. The 3GPP work on LTE is also referred to as Evolved Universal Terrestrial Access Network (E-UTRAN). LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex (FDD) and Time Division Duplex (TDD) modes.

In mobile communication systems, it is generally the base stations that allocate the resources for transmissions in both uplink and downlink. In a LTE, a wireless device, referred to as a User Equipment, UE, carries out measurements to provide indications to the base station on the perceived radio propagation conditions in what is called Channel Quality Indicator reporting. Based on the reporting the base station can decide roughly which Modulation and Coding Scheme (MCS) to use for communication with the UE. One example of mapping between CQI and MCS is shown in Table 1 below, which is the retrieved from 3GPP TS 36.213 V10.12.0 section 7.2.3. In low channel quality (low CQI index) more forward error correction encoding is needed for successful decoding of the information bits, and vice versa in high channel quality i.e. high CQI index. Hence at high CQI the throughput of information bits can be made higher than at low CQI.

TABLE 1

| 4-bit CQI table from 3GPP | | | |
|---|---|---|---|
| CQI index | modulation | code rate × 1024 | Efficiency |
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |

TABLE 1-continued

| 4-bit CQI table from 3GPP | | | |
|---|---|---|---|
| CQI index | modulation | code rate × 1024 | Efficiency |
| 14 | 64QAM | 873 | 5.1152 |
| 15 | 64QAM | 948 | 5.5547 |

In order to get a good system throughout the base station, in LTE referred to as an eNB, carries out link adaptation by which it matches each UE's reported channel quality to an MCS that provides the right balance between system throughput and throughput for the individual user. The MCS is indicated to the UE in the Downlink Control Information (DCI) provided over Physical Data Control Channel, PDCCH in LTE. This is shown in Table 2 from the same TS.

In addition to CQI reporting, a base station typically has an outer loop that based on ACK/NACK reports tunes in the MCS value to a suitable value giving a BLER (ratio between NACKs and total number of received or expected ACK/NACKs) of e.g. 10%. Besides catering for flexibility in which target BLER is used (e.g. 1%, 10%, 30%), it also solves the problem that each UE model or even UEs of the same model may have an individual bias in the reported CQI. The base station thus maintains a UE-specific CQI offset which it tunes to give the desired BLER target.

TABLE 2

| Modulation and TBS index table for PDSCH | | |
|---|---|---|
| MCS Index $I_{MCS}$ | Modulation Order $Q_m$ | TBS Index $I_{TBS}$ |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

Existing control loops on base station side for determining the UE-specific MCS are largely based on maintaining a particular BLER ratio and identifying UE-specific bias in the CQI reporting. Once the CQI bias has been identified the base station can more accurately select MCS based on the CQI reported by the UE. During identification of the CQI bias the base station will decrease or increase the MCS until the BLER target is met over some interval of time.

The expansion of machine-type communication (MTC) toward industrial applications is seen as one of the key features in future communication systems. The requirements on connectivity are very diverse and largely depend on the use case of an industrial application to be operated. Therefore, different Critical-MTC (i.e., ultra-reliable MTC) solutions will be needed. Besides the end-to-end latency, the Critical-MTC concept should address the design trade-offs regarding transmission reliability, mobility, energy-efficiency, system capacity and deployment, and provide solutions for how to design a wireless network in a resource and energy efficient way while enabling ultra-reliable communication.

For scheduling of UEs that are to fulfill extreme requirements on BLER, e.g. down to $10^{-9}$, while at the same time fulfilling extreme requirements on latency, i.e. being able to send and receive new information every subframe, block errors have to be avoided as far as possible.

With existing implementation it may however be problematic to adjust to transmission properties such as MCS to resource efficient levels without introducing block errors occasionally and as a result the base station (or network node) is forced to be very conservative in the MCS selection. Being conservative implies using a lower/less aggressive MCS than called for, resulting in that more resources are used for the particular UE than necessary, with reduced system throughput as result.

SUMMARY

An object of the present disclosure is to provide a method which seeks to mitigate, alleviate, or eliminate one or more of the above-identified deficiencies in the art and disadvantages singly or in any combination.

This is obtained by a method, performed in a radio network node that is communicating with a wireless device, of configuring transmission properties. The method comprises obtaining information indicative of a decoding margin of a successful decoding of a first transport block transmitted, using a set of transmission properties, between the radio network node and the wireless device and reconfiguring the transmission properties to be used for further transmissions between the radio network node and the wireless device, based on the obtained information indicative of a decoding margin. Thereby, the base station can be less conservative when selecting transmission properties for the wireless device, thereby allowing more resources to be used for other wireless devices. This may be done without risking occasionally loosing transport blocks. As a consequence the system throughput can be improved while at the same time offering highly reliable communication with the device.

According to some aspects, the reconfiguring comprises changing the robustness of transmissions of one or more further transport blocks between the radio network node and the wireless device, in relation to robustness of the transmission of the first transport block. Robustness typically corresponds to resource use. Hence, by changing robustness, resources may be made available.

According to some aspects, the information indicative of a decoding margin comprises an indication of a share of a processing capacity of the radio network node or the wireless device, that was used for the reception and/or decoding of the first transport block. By indicating resource use in the wireless device, the transmission properties may be adjusted to match the actual resources in the wireless device.

According to some aspects, the reconfiguring comprises selecting transmission properties corresponding to a robustness which is higher than the robustness of transmissions of the transmission of the first transport block, if the information indicative of a decoding margin is below a predefined level. According to some aspects, the reconfiguring comprises selecting transmission properties corresponding to a robustness which is lower than the robustness of transmissions of the transmission of the first transport block, if the information indicative of a decoding margin is above a predefined level. Hence, robustness or resource use may be either increased or decreased in order to find the right level.

According to some aspects, the method further comprises calculating an accumulated decoding margin, representing the information indicative of a decoding margin of previous and present transport blocks transmitted, using the set of transmission properties, between the radio network node and the wireless device. Then, the reconfiguring is based on the accumulated decoding margin.

According to some aspects, the transmission properties comprise one or several of the following properties: Modulation and Coding Scheme, Radio Access Technology, Multiple Input Multiple Output transmission modes, Beam forming, Pre-coding Matrix and Transmission Power.

According to some aspects, the transport block is transmitted from the wireless device to the radio network node. Then the method comprises receiving the first transport block from the wireless device; wherein the first transport block is transmitted using a set of transmission properties. The method then further comprises decoding the first transport block. According to this aspect, the reconfiguring comprises reconfiguring the transmission properties to be used for further transmissions from the wireless device, based on the information indicative of a decoding margin.

According to some aspects, the transport block is transmitted from the radio network node to the wireless device. The method then comprises transmitting, using a set of transmission properties, the first transport block to the wireless device. Then the obtaining comprises receiving, from the wireless device, an acknowledgement confirming reception and successful decoding of the first transport block in the wireless device and information defining information indicative of a decoding margin of the decoding and the reconfiguring comprises reconfiguring the transmission properties to be used for transmissions of one or more further transport blocks to the wireless device, based on the information indicative of a decoding margin.

According to some aspects, the disclosure relates to a computer program comprising computer program code which, when executed in a programmable controller of a radio network node, causes the radio network node to execute the methods described above and below.

According to some aspects, the disclosure relates to radio network node comprising a radio communication interface and processing circuitry. The processing circuitry is configured to obtain information indicative of a decoding margin of a successful decoding of a first transport block transmitted between the radio network node and a wireless device, and to reconfigure the transmission properties to be used for further transmissions between the radio network node and the wireless device based on the obtained information indicative of a decoding margin.

The radio network node is further configured to perform all the aspects of the method in a network node described above and below.

According to some aspects, the disclosure also relates to a computer program comprising computer program code which, when executed in a programmable controller of a radio network node, causes the radio network node to execute the methods described above and below.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

ABBREVIATIONS

Figure 1A:
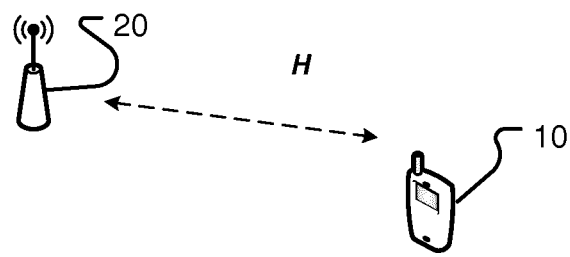
FIG. 1a is illustrating a radio network node and a wireless device.

ACK Acknowledged
ARQ Automatic repeat request
BLER Block error rate
CQI Channel quality indicator
CRS Cell specific reference signals
CSI Channel state information
DCI Downlink control information
DL Downlink
eICIC Enhanced ICIC
FFT Fast Fourier transform
HACK Hard ACK
HARQ Hybrid automatic repeat request
ICIC Inter-cell interference coordination
MCS Modulation and coding scheme
NACK Not Acknowledged
OFDM Orthogonal Frequency Division Modulation
PCFICH Physical control format indicator channel
PDCCH Physical downlink control channel
PDSCH Physical downlink shared channel
PHICH Physical HARQ indication channel
PUCCH Physical uplink control channel
PUSCH Physical uplink shared channel
PDU Protocol data unit
QoS Quality of service
RLC Radio link control
SACK Soft ACK
SAR Soft-to-Hard ACK rate
SG Scheduling grant
SR Scheduling request
SRS Sounding reference signals
TTI Transmission time interval
UCI Uplink control information
UE User equipment
UL Uplink

DETAILED DESCRIPTION

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

The inventors have realized that it may be useful for the scheduler to know, how close to its limit in terms of physical layer capacity, the receiver is operating. For example if a eNodeB is transmitting to a UE, the eNodeB would benefit from knowing to what extent the physical resources in the UE needed to decode the transport block are used. The eNodeB may, based on such knowledge, optimize the transmission properties, with less risk of introducing block errors occasionally. In a similar manner, an eNodeB that is receiving a transport block from a wireless device may use the information indicative of a decoding margin as input to future uplink scheduling from the UE.

The information indicative of a decoding margin may e.g. reflect how many of the turbo decoder iterations that are remaining when successfully decoding the block, or similar kind of metrics.

Figure 1B:
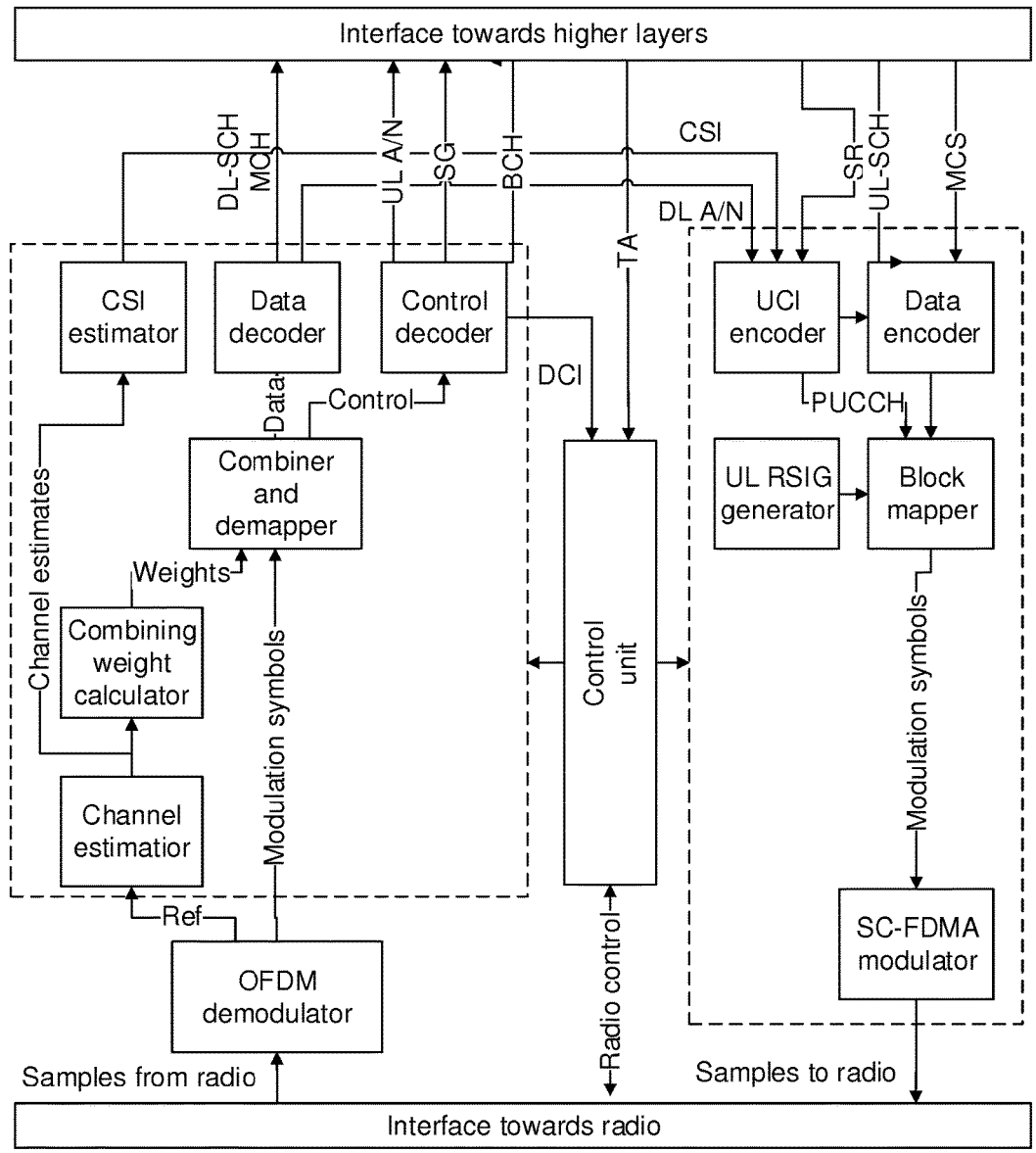
FIG. 1b is a sketch of LTE physical layer downlink and uplink processing.

A simplified sketch of the LTE physical layer in a UE is provided in FIG. 1b. Samples are received from the radio, and subjected to an FFT in the OFDM demodulator. The output comprises resource elements carrying e.g. modulation symbols and reference signals. The reference signal are used by the Channel estimator for estimating the radio channel, and from the channel estimates and information on transmission mode and allocated bandwidth the optimum combining weights are derived by the Combining weight calculator. Some reference signals are also used by the CSI estimator for calculating channel state information (CSI, including COI) which is fed back to the radio network node. Received modulation symbols and combining weights are fed to the Combiner and demapper which produce soft bits, which further are input to either of the decoders, depending on channel.

The UE first receives and decoded PDCCH (physical downlink control channel) to find downlink control information (DCI) providing information on allocations on PDSCH (physical downlink shared channel) as well as the transmission mode and modulation and coding scheme (MCS) in use, uplink allocations (scheduling grant; SG), uplink power control commands, etc. However before receiving it the UE decodes the physical control format indicator channel (PCFICH) which tells how large the control region is, i.e., how many of the initial OFDM symbols in the subframe are carrying PDCCH. Also, before the decoding the radio propagation channel needs to be estimated and combining weights be produced.

PDCCH is convolutional encoded and is decoded by the Control decoder. The decoded DCI is fed to the Control unit which is used for configuring the baseband. The Control decoder further outputs feedback from the radio network node on whether transmissions on the uplink were successfully decoded or not (UL ACK/NACK; UL A/N), and is also used for decoding the master information block (MIB) carried on PBCH (physical broadcast channel).

Once the DCI has been decoded, generally at a point in time about in the middle of the subframe, the PDSCH is next. Remaining reference signals in the subframe are used for improving the channel estimates, combining weights are tailored for the transmission mode in use, and then the received modulation symbols are combined and demapped, resulting in soft bits to be subjected to decoding. Since the whole subframe has to be received before the decoding can start, timing-wise this happens in the following subframe, in a pipelined fashion, while control information is received and decoded.

PDSCH is turbo encoded and it is decoded using the Data decoder which mainly comprises hybrid automatic request (HARQ) functionality with associated soft bit combiner, and a turbo decoder. The turbo decoder iterates the decoding until the received data is successfully decoded (as indicated by a successful cyclic redundancy check; CRC) or until running out of time (iterations). In case of failure to decode it may give up earlier if metrics indicate that not much more information is corrected in subsequent iterations, so called early give-up function (EGF). Due to the pipelined fashion of processing the turbo decoder has to finish within the duration of one subframe. Feedback on whether data was successfully decoded or not (ACK/NACK; DL A/N) is provided to the radio network node in subframe n+4, where subframe n is the subframe where the data was received.

The CSI reporting may be either periodical, by which the UE knows beforehand when it is to be reported, but may also be a periodical by which the UE gets informed in the DCI that a CSI report is to be sent in subframe n+4.

The processing time for the OFDM demodulator, Channel Estimator, Combining weight calculator, Combiner and demapper, and Control decoder is highly dependent on the bandwidth in use, whereas the processing time for the Data decoder mainly depends on the UE category which is dictating the size of the HARQ buffers.

When the UE has received an SG in subframe n, it is to transmit on the physical uplink shared channel (PUSCH) in subframe n+4. Scheduling requests (SR), DL A/N, and CSI constitute the uplink control information (UCI) which is encoded by the UCI encoder. Data to be transmitted is encoded by the Data encoder which carriers out Turbo encoding, and then UCI is inserted. The modulation symbols are fed to the Block mapper, which maps the modulation symbols and uplink reference symbols, produced by UL RSIG generator, to the granted allocation. The resulting sequences of symbols are fed to the SC-FDMA modulator which essentially carries out an IFFT, and the output is sent to the radio.

In case no scheduling grant is received but the UE is to provide UL A/N, CSI and SR, the information is transmitted on the physical uplink control channel (PUCCH) according to a predefined format.

The processing time for UL RSIG generator, Block mapper, and SC-FDMA modulator is highly dependent on the bandwidth in use, whereas the processing time for Data encoder is depending on the UE category.

Further, due to timing advance, TA, and the standard stipulating that cell radius up to 100 km shall be supported, the uplink subframe n may have to be transmitted 0.67 ms before downlink subframe n has been received. Hence the UE will have to be able to do all data- and CSI-related processing of a subframe within roughly 2 ms, to meet the times for DL A/N, acting on aperiodic CSI reporting requests, acting on UL A/N from network node, etc.

It shall be noted that due to cost and power effectiveness a UE is generally designed with just the processing capacity, memory size, etc. needed for the supported features and capabilities, e.g. number of DL and UL carriers, respectively, and supported bandwidth for each of them. This is reflected e.g. by that the FFTs and IFFTs are designed to meet the deadlines on OFDM symbol basis, but not much quicker.

Hence, this disclosure proposes informing a base station about the constraints of the physical layer of the UE. The base station may then, instead of maintaining a target BLER, maintain a target decoding margin. Tuning the MCS based on information indicative of a decoding margin allows the base station to be more aggressive when searching for a proper MCS, as it can do so without introducing block errors. Since less conservative MCS will be used for the UE, more resources will be available to other UEs and the system throughput will improve.

The proposed technique of providing extended transmission feedback will now be described in further detail, using LTE as an example. In cellular systems such as LTE, a wireless device, in LTE called User Equipment, UE, gets configured by the base station which MCS and allocation size to use for transmissions on the uplink. Hence, for uplink there is only a base station aspect of the disclosure and no need for information indicative of a decoding margin sent from the base station to the UE.

However, for the downlink, the UE needs to provide the eNodeB about information indicative of a decoding margin.

It should be noted that although terminology from 3GPP LTE is used herein to explain the example embodiments, this should not be seen as limiting the scope of the example embodiments to only the aforementioned system. Other wireless systems, including Wifi, WCDMA, WiMax, UMB and GSM, and future radio access systems may also benefit from the example embodiments disclosed herein.

FIG. 1a illustrates a communication system comprising a radio network node 20, in LTE an eNodeB, and a wireless device 10, in LTE a UE, where the proposed technique may be implemented. In this example the eNodeB 20 transmits a transport block to the UE 10, whereby the UE acknowledges successful reception and indicated a margin of the successful decoding using the proposed technique. Thereby, the UE informs the eNodeB how strained the resources of the physical layer, shown in FIG. 1b, are.

Figure 2:
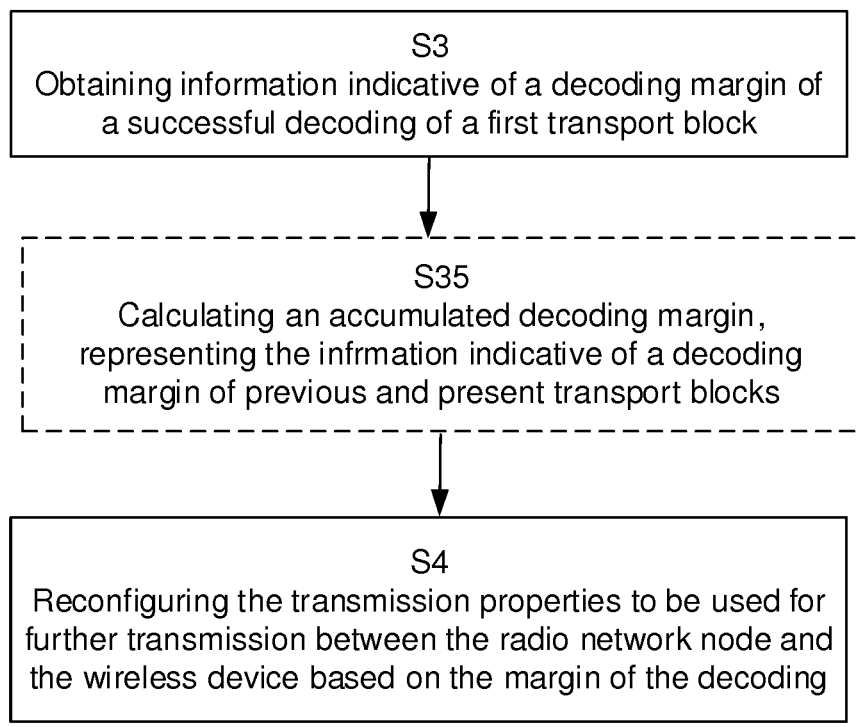
FIG. 2 is a flowchart illustrating embodiments of method steps in a radio network node.

FIG. 2 illustrates the general concept of the proposed technique implemented in a network node.

Figure 3:
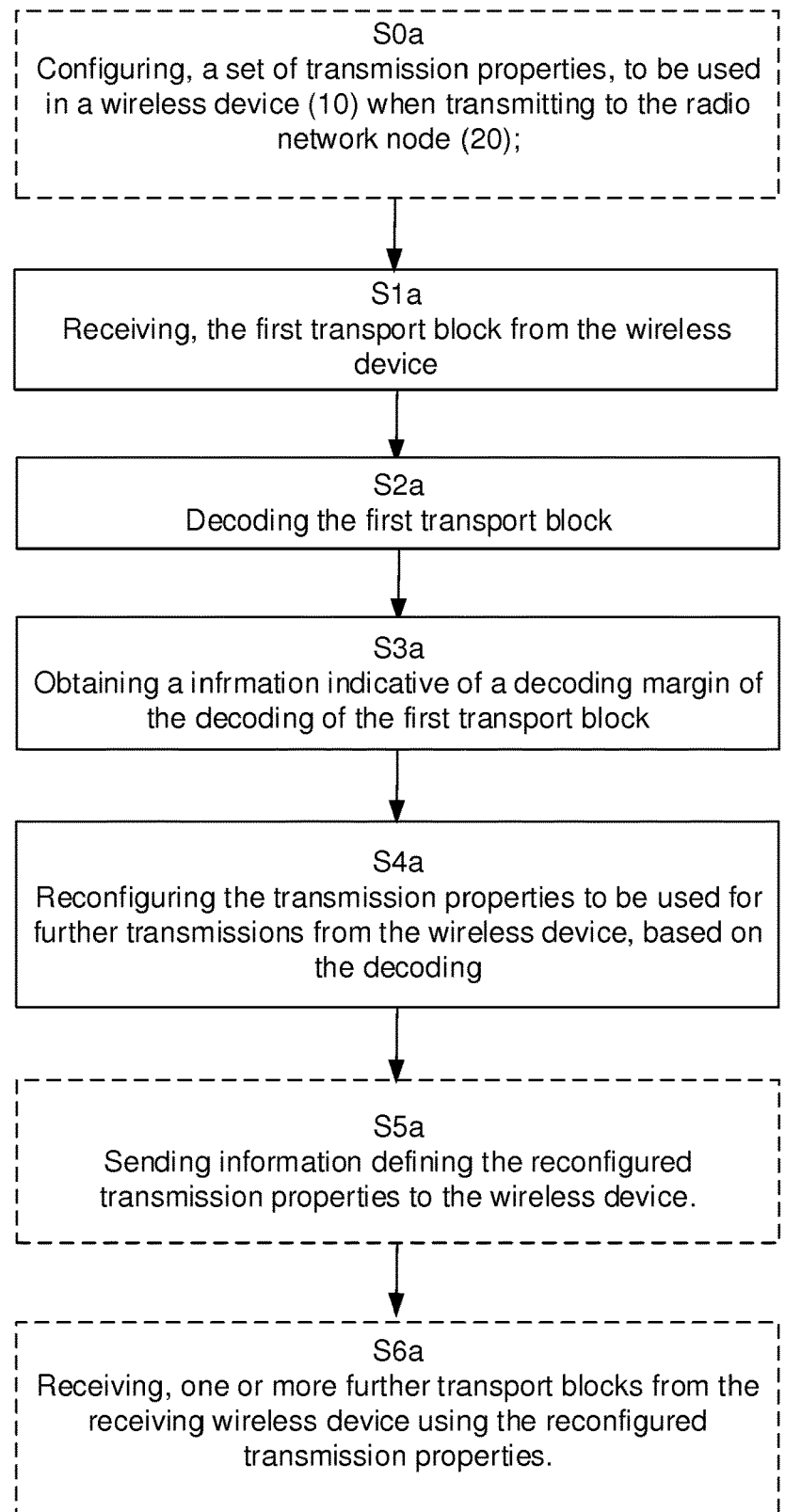
FIG. 3 is a flowchart illustrating embodiments relating to uplink transmission.
Figure 4:
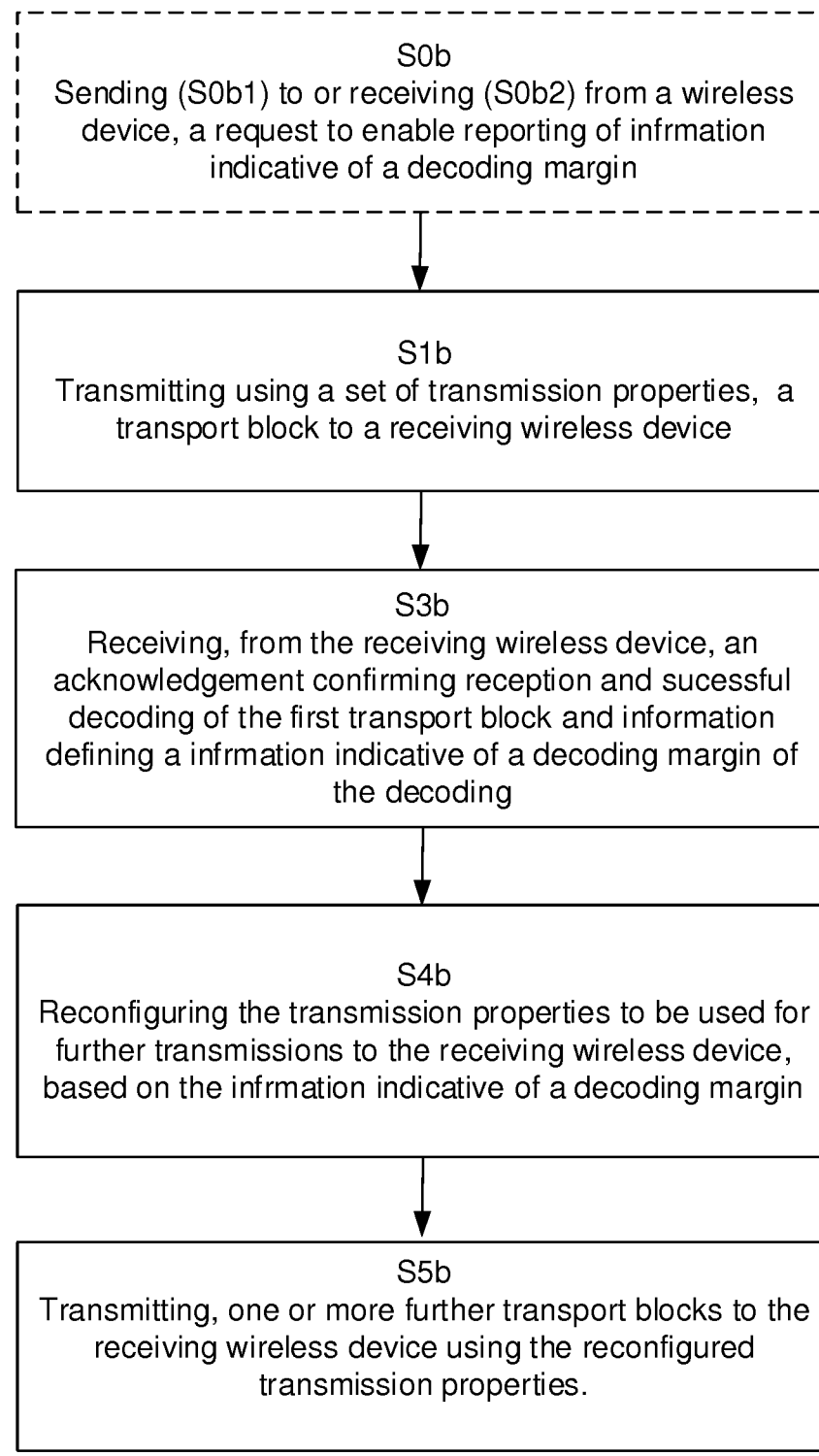
FIG. 4 is a flowchart illustrating embodiments relating to downlink transmission.

It should be appreciated that FIGS. 2-4 comprises some operations which are illustrated with a solid border and some operations which are illustrated with a dashed border. The operations which are comprised in a solid border are operations which are comprised in the broader example embodiment. The operations which are comprised in a dashed border are example embodiments which may be comprised in, or a part of, or are further operations which may be taken in addition to the operations of the solid border example embodiments. It should be appreciated that the operations need not be performed in order. Furthermore, it should be appreciated that not all of the operations need to be performed. The example operations may be performed in any suitable order and in any combination.

A method, performed in a radio network node 20 that is communicating with a wireless device 10, of configuring transmission properties. The method comprises obtaining S3 information indicative of a decoding margin of a successful decoding of a first transport block transmitted, using a set of transmission properties, between the radio network node 20 and the wireless device 10.

Information indicative of a decoding margin is e.g. the decoding margin. The decoding margin defines the share of the available resources, e.g. processing capacity, in the wireless device that was required to successfully decode the block. In principle, the decoding margin will reflect other blocks in the physical layer described above as well. However, the information indicative of a decoding margin may include other metrics as well reflecting the steps before the decoder. Different metrics may be used to define the decoding margin such as time, iterations or active blocks or units.

For uplink transmissions the decoding is performed in the radio network node. The obtaining of information indicative of a decoding margin then comprises reading information that is available in the radio network node. For downlink transmissions the decoding is performed in the UE that is receiving the transport block. The radio network node then needs to receive information about the information indicative of a decoding margin from the wireless device. These two variants will be further discussed below.

According to some aspects, the information indicative of a decoding margin comprises an indication of a share of a processing capacity of the radio network node 20 or the wireless device 10, that was used for the reception and/or decoding of the first transport block. According to some aspects, the processing capacity is the processing capacity of one or more digital signal processors implementing physical layer processing of the unit performing the decoding.

According to some aspects, the margin of the decoding indicates a number of iterations of the decoding. One example is turbo decoder iterations as described in connection with FIG. 1a. Hence, if a number of iterations above a predefined threshold were required to decode the transport block, then a Soft ACK is transmitted. This indicates that the effort needed to decode the transport block was big.

According to some aspects, the margin of the decoding indicates a number of hardware units being activated or used during the reception and/or decoding. For example, if several receiver branches or receiver antennas that are active a SACK is transmitted. E.g., the acknowledged present mode requires the UE to use 2 Rx antennas but it may have 4 and can therefore enable more antennas to improve the reception. Then a Hard ACK would be transmitted, indicating a smaller effort.

Other examples of hardware units are processing units or memory units. The information indicative of a decoding margin could also be calculated based on a combination of iterations, hardware units and other parameters. One example of a parameter is BER (bit error rate) which can be calculated by a decoder when successfully decoding a message i.e., detecting where Forward Error Correction (FEC) kicked in.

The method further comprises reconfiguring S4 the transmission properties to be used for further transmissions between the radio network node 20 and the wireless device 10, based on the obtained information indicative of a decoding margin. In other words, the radio network node may utilize the margin of the decoding in order to improve utilization of network resources.

According to some aspects, the reconfiguring S3 comprises changing the robustness of transmissions of one or more further transport blocks to the receiving wireless device 10, in relation to robustness of the transmission of the transport block. The robustness is the risk of block errors and is typically dependent on resource use.

According to some aspects, the reconfiguring S3 comprises selecting transmission properties corresponding to a robustness which is higher than the robustness of the transmission of the transport block, if the margin of the decoding is below a predefined level. According to some aspects, reconfiguring S3 comprises selecting transmission properties corresponding to a robustness which is lower than the robustness of the transmission of the transport block, if the margin of the decoding is above a predefined level. In other words, if the information indicative of a decoding margin is high, the radio network node may choose to select a less robust transmission in any way. Such a predefined level may be predefined or dynamically adjusted based on the current circumstances or services used. For C-MTC a specific level may be used.

Hence, robustness is typically increased by adding resources or decreased by reducing resources. Resources are e.g. physical resources or radio resources (time and/or frequency).

According to some aspects, robustness is adjusted by transmitting on the downlink using transmit diversity instead of using spatial diversity even should the UE have reported channel conditions (rank via RI) that would allow spatial diversity to be used (MIMO).

According to some aspects, robustness is be adjusted by combining other means than MCS alone. For instance, downlink transmissions may use different power offsets between data and reference symbols for the UE allocation, or may apply ICIC/eICIC to improve the reception of a UE at the cell border.

Robustness may also be adjusted by transmitting on the downlink using transmit diversity instead of using spatial diversity even should the UE have reported channel conditions (rank via RI) that would allow spatial diversity to be used (MIMO).

Typically, the robustness is not changed on block basis, but based on an average information indicative of a decoding margin e.g. ratio between SACK and HACK. This ratio in turn controls whether the robustness level is to be changed. This is similar to existing outer loop link adaptation, where MCS offset is adjusted to have a BLER of e.g. 10%.

Hence, according to some aspects, the method further comprises calculating S35 an accumulated decoding margin, representing the information indicative of a decoding margin of previous and present transport blocks transmitted, using the set of transmission properties, between the radio network node 20 and the wireless device 10. Then the reconfiguring S4 is based on the accumulated decoding margin.

According to some aspects, the method further comprises transmitting S4, using the reconfigured transmission properties, one or more further transport blocks to the receiving wireless device 10.

Uplink Transmission

FIG. 3 illustrates aspects of the proposed methods wherein the transport block is transmitted from the wireless device 10 to the radio network node 20, also referred to as the uplink variant.

In cellular systems such as LTE, a wireless device, in LTE called User Equipment, UE, gets configured by the base station which MCS and allocation size to use for transmissions on the uplink. Hence, for uplink there is only a base station aspect of the disclosure and no need for information indicative of a decoding margin sent from the base station to the UE.

Hence, according to some aspects the method is initiated by the radio network node configuring S0a, a set of transmission properties, to be used in the wireless device 10 when transmitting to the radio network node 20. This is an operation performed by the scheduler in the radio network node.

In the uplink transmission example, the method comprises the radio network node receiving S1a the first transport block from the wireless device 10. The method then further comprises the radio network node decoding S2a the first transport block in the radio network node 20.

The radio network node 20 may then obtain the information indicative of a decoding margin by reading or investigating the capacity required in the radio network node, which was required in order to decode the block. As discussed above the information indicative of a decoding margin may be obtained by investigating decoder iterations or active hardware.

According to these aspects, the reconfiguring S4 comprises reconfiguring S4a the transmission properties to be used for further transmissions from the wireless device 10 to the radio network node, based on the information indicative of a decoding margin. As discussed above such transmissions are typically scheduled from the radio network node. The reconfiguration is performed as discussed in relation to FIG. 2 above.

According to some aspects, the method further comprises sending S5a information defining the reconfigured transmission properties to the wireless device. This is typically done by the radio network node when scheduling a further transmission from the wireless device. Hence, if the information indicative of a decoding margin was high the radio network node may select to schedule a less robust transmission, as discussed above.

Then the radio network node may receive S6a, one or more further transport blocks from the wireless device using the reconfigured transmission properties. It is then assumed that reconfiguration is generally possible without introducing block errors occasionally. It must be understood, that block errors may of course occur anyway, if the channel properties are varying. However, that would be outside the scope of this disclosure.

Downlink Transmission

FIG. 4 illustrates aspects of the proposed methods wherein the first transport block is transmitted from the radio network node 20 to the wireless device 10, also referred to as the downlink variant.

In LTE called the base station itself controls which MCS and allocation size to use for transmissions on the downlink. However, for the downlink transmissions the decoding is performed in the wireless device, in LTE called UE. Hence, for downlink, the UE needs to provide the eNodeB with information indicative of decoding margin.

Incremental redundancy allows a wireless device to attempt to receive and decode a first redundancy version of the transport block, and in case it fails, it receives a second redundancy version of the transport block, which it combines with the first one in so called soft combining and tries to decode. (Re)-transmissions of the same transport block occur at minimum 8 ms distance unless features such as Transmission time interval, TTI, bundling are used, by which several redundancy versions are transmitted in subsequent subframes without waiting for feedback on whether a previous redundancy version was successfully decoded.

Hybrid Automatic Repeat reQuest (HARQ) is an integral part of the 3G and 4G standards that allows reliable communication between a wireless device and a network node by means of incremental redundancy. The transport block to be transmitted is subjected to forward error correction encoding by which redundancy is introduced. The number of bits increases due to the introduced redundancy, but not all bits are sent at the same time. The resulting bits are segmented into several so called redundancy versions, where each such redundancy version further is punctured before being sent in order to fit it within the given allocation (one or more resource block pairs). How much is punctured is depending on how many bits (information plus redundant bits) that can be carried in the allocation, which further is depending on the allocation bandwidth, the modulation (e.g. QPSK, 16QAM, 256QAM) in use, and the presence of broadcasted signals and channels in the allocated bandwidth. The ratio between the information bits and information bits plus redundant bits in a transport block is referred to as code rate. The combination of code rate and modulation type is referred to as Modulation and Coding Scheme.

In case the maximum number of retransmissions is reached without the receiving entity being able to decode the transport block, it will be detected by higher layers e.g. Radio Link Control, RLC, generally within 50-100 ms that a Protocol Data Unit (PDU) is missing and a retransmission is requested for all transport blocks that comprise the RLC PDU, even those that may have been successfully. This is referred to as Automatic Repeat request (ARQ) and has considerably larger latency than HARQ retransmissions.

The receiving entity, wireless device or base station, provides feedback to the transmitting entity on whether it decoded the transport block successfully, ACK, or whether it failed, NACK. The transmitting entity may then decide on whether to transmit another redundancy version for the same block, or send a redundancy version for a next transport block.

Hence, for the downlink implementation it is required to introduce ACK reporting, including information indicative of a decoding margin information.

In other words, a finer granularity in the ACK reporting from a wireless device needs to be introduced. The existing HARQ implementation typically allows binary reporting (ACK or NACK), or possibly several NACK levels. To better allow tuning of MCS on the base station side without introducing more block errors one may introduce two or more levels of ACK, e.g., "Soft ACK", and "Hard ACK", where Soft ACK indicates that the block was decoded by the UE with low margin to exhaustion of physical layer processing resources, and Hard ACK indicates that the block was decoded with a good such margin.

According to some aspects, the method further comprises sending S0b1 a request to enable reporting of information indicative of a decoding margin, to the wireless device 10. According to some aspects, the method further comprises receiving S0b2 a request to enable reporting of information indicative of a decoding margin, from the wireless device 10.

According to this aspect the first transmission, S1b, uses a set of transmission properties.

According to the downlink variant of the disclosure, the obtaining S3 comprises receiving S3b, from the wireless device 10, an acknowledgement confirming reception and successful decoding of the first transport block in the wireless device 10 and information defining information indicative of a decoding margin of the decoding. The acknowledgement is a signal passed between communicating devices to signify acknowledgement, or receipt of response, as part of a communications protocol. In other words, the receiving wireless device indicated that the transport block was successfully decoded and the no retransmissions are required. The ACK defines a margin of the decoding. Hence, the ACK comprises information indicating the constraints of receiving wireless device. The constraint may e.g. be indicated as a part of a total capacity. Thus, according to some aspects, the margin of the decoding comprises an indication of a portion of a processing capacity of the radio network node 20 that was used for the reception and/or decoding of the transport block.

According to some aspects of this variant, the receiving S3b implies receiving information defining one of several possible ACK levels, wherein each level corresponds to a margin of the decoding within a pre-defined range. Stated differently, the information indicative of a decoding margin is an indication on whether decreasing the robustness of the transmission S1b, would cause a severe risk in unsuccessful decoding. This aspect implies that one or more ACK levels are introduced; wherein each ACK level represents information indicative of a decoding margin, i.e. how much of its capacity or how much effort the receiver and/or decoder had to use in order to successfully decode the block. For example Soft ACK and Hard ACK, where Soft ACK indicates that the UE successfully decoded the block but just barely so. Hard ACK indicates that the block was successfully decoded with good margin. By receiving Soft ACK the base station is informed that there is a risk due to channel variations that a subsequent package will fail. The UE may decide whether to send Soft ACK or Hard ACK for a successfully decoded block based on how close to its physical layer processing capacity it is.

According to the downlink variant of the disclosure, the reconfiguring S4 comprises reconfiguring S4b the transmission properties to be used for transmissions of one or more further transport blocks to the wireless device 10, based on the information indicative of a decoding margin. Hence, if the UE communicates that the information indicative of a decoding margin is good, the radio network node may select a less robust transmission as described above and vice versa.

According to some aspects of this variant, the method further comprises transmitting S5b, using the reconfigured transmission properties, one or more further transport blocks to the wireless device 10.

Example Node Configuration of a Radio Network Node

Figure 5:
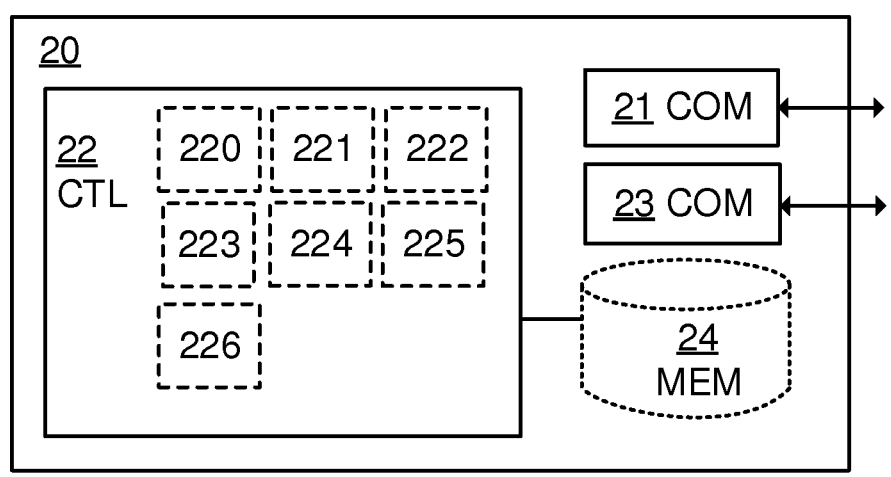
FIG. 5 is an example node configuration of a radio network node, according to some of the example embodiments.

FIG. 5 illustrates an example of a radio network node 20 which may incorporate some of the example node operation embodiments discussed above. The radio network node is e.g. an eNodeB. As shown in FIG. 5, the radio network node 20 may comprise a radio communication interface 21 configured to receive and transmit any form of communications or control signals within a network. It should be appreciated that the radio communication interface 21 may be comprised as any number of transceiving, receiving, and/or transmitting units or circuitry. It should further be appreciated that the radio communication interface 21 may be in the form of any input/output communications port known in the art. The radio communication interface 21 may comprise RF circuitry and baseband processing circuitry (not shown).

The radio network node 20 may comprise a network communication interface 23 configured to exchange any form of communications or control signals with a core network and/or with other network nodes. The network communication is typically referred to as a backhaul.

The radio network node 20 may further comprise at least one memory unit or circuitry 24 that may be in communication with the radio communication interface 21. The memory 24 may be configured to store received or transmitted data and/or executable program instructions. The memory 24 may also be configured to store any form of beam-forming information, reference signals, and/or feedback data or information. The memory 24 may be any suitable type of computer readable memory and may be of volatile and/or non-volatile type. According to some aspects, the disclosure relates to a computer program comprising computer program code or instruction sets which, when executed in a first wireless node, causes the first wireless node to execute any aspect of the example node operations described above.

The radio network node 20 may further comprise a controller or processing circuitry 22 configured to obtain information indicative of a decoding margin of a successful decoding of a first transport block transmitted between the radio network node 20 and a wireless device 10, and to reconfigure the transmission properties to be used for further transmissions between the radio network node 20 and the wireless device 10 based on the obtained information indicative of a decoding margin.

The processing circuitry 22 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry. The processing circuitry is further adapted to perform all the aspects of the method in a network node described above and below.

According to some aspects, the processing circuitry is further configured to reconfigure the transmission properties by changing the robustness of transmissions of one or more further transport blocks between the radio network node 20 and the wireless device 10, in relation to robustness of the transmission of the first transport block. For example, the information indicative of a decoding margin comprises an indication of a share of a processing capacity of the radio network node 20 or the wireless device 10, that was used for the reception and/or decoding of the first transport block.

According to some aspects, the processing circuitry is further configured to reconfigure the transmission properties by selecting transmission properties corresponding to a robustness which is higher than the robustness of transmissions of the transmission of the first transport block, if the information indicative of a decoding margin is below a predefined level.

According to some aspects, the processing circuitry is further configured to reconfigure the transmission properties by selecting transmission properties corresponding to a robustness which is lower than the robustness of transmissions of the transmission of the first transport block, if the information indicative of a decoding margin is above a predefined level.

According to some aspects, the processing circuitry is further configured to calculate S35 an accumulated decoding margin, representing the information indicative of a decoding margin of previous and present transport blocks transmitted, using the set of transmission properties, between the radio network node 20 and the wireless device 10. Then, the reconfiguring S4 is based on the accumulated decoding margin.

According to some aspects, the transmission properties comprises one or several of the following properties: Modulation and Coding Scheme, Radio Access Technology, Multiple Input Multiple Output transmission modes, Beam forming, Pre-coding Matrix and Transmission Power According to some aspects, the processing circuitry is configured to obtaining information indicative of a decoding margin of a successful decoding of a first transport block transmitted, to the radio network node 20 from the wireless device 10. This corresponds to the uplink version of the proposed technique. The processing circuitry is then configured to receive the first transport block from the wireless device 10. Then block is transmitted using a set of transmission properties.

In the uplink version of the proposed technique, the radio network node is configured to decode the first transport block. In the uplink variant, the processing circuitry is configured to reconfigure the transmission properties to be used for further transmissions from the wireless device 10, based on the information indicative of a decoding margin. Typically, the processing circuitry is configured to sending information defining the reconfigured transmission properties to the wireless device 10. This is e.g. done by scheduling the wireless device.

According to some aspects, the processing circuitry is configured to configure, a set of transmission properties, to be used in the wireless device 10 when transmitting to the radio network node.

According to some aspects, the processing circuitry is configured to receive, one or more further transport blocks from the wireless device using the reconfigured transmission properties.

When the proposed technique is applied on a downlink transmission, the processing circuitry is configured to obtain information indicative of a decoding margin of a successful decoding of a first transport block transmitted, from the radio network node 20 to the wireless device 10. Then the processing circuitry is configured to transmit, using a set of transmission properties, the first transport block to a wireless device 10 and the processing circuitry is configured to obtain, from the wireless device 10, an acknowledgement confirming reception and successful decoding of the first transport block in the wireless device 10 and information defining information indicative of a decoding margin of the decoding. In the downlink variant the processing circuitry is configured to reconfigure the transmission properties to be used for transmissions of one or more further transport blocks to the wireless device 10, based on the information indicative of a decoding margin.

Typically, the processing circuitry is configured to transmit, using the reconfigured transmission properties, one or more further transport blocks to the wireless device 10.

According to some aspects, the receiving S4b comprises receiving information defining one of several possible ACK levels, wherein each level corresponds to information indicative of a decoding margin within a pre-defined range.

As discussed above the reporting of information indicative of a decoding margin may be initiated in different ways. According to some aspects, the processing circuitry is configured to send a request to enable reporting of information indicative of a decoding margin, to the wireless device 10. According to some aspects, the processing circuitry is configured to receive a request to enable reporting of information indicative of a decoding margin, from the wireless device 10.

According to some aspects, the processing circuitry is configured to obtaining information indicative of a decoding margin of a successful decoding of a first transport block transmitted, to the radio network node 20 from the wireless device 10. Then the processing circuitry is configured to receive the first transport block from the wireless device 10 and to decode the first transport block. Then the processing circuitry is configured to reconfigure the transmission properties to be used for further transmissions from the wireless device 10, based on the information indicative of a decoding margin.

According to some aspects, the processing circuitry is configured to send information defining the reconfigured transmission properties to the wireless device 10. According to some aspects, the processing circuitry is configured to configure, a set of transmission properties, to be used in the wireless device 10 when transmitting to the radio network node 20. According to some aspects, the processing circuitry is configured to receive, one or more further transport blocks from the wireless device using the reconfigured transmission properties.

According to some aspects, the radio network node 20, or the processing circuitry 22, comprises one or more physical modules for performing the different method steps and aspects described above. The modules are implemented in hardware or in software or in a combination thereof. The modules are according to some aspects implemented as a computer program stored in a memory 24 which run on the processing circuitry 22. Examples of such modules are:

An initiator 220 configured to send to or receive from a wireless device, a request to enable reporting of information indicative of a decoding margin.

A receiver 221 configured to receive, the first transport block from the wireless device A decoder 222 configured to decode the first transport block An obtainer 223 configured to obtain a decoding margin of a successful decoding of a first transport block.

A calculator 2235 configured to calculate an accumulated decoding margin, representing the decoding margin of previous and present transport blocks A reconfigurer 224 configured to reconfigure the transmission properties to be used for further transmission between the radio network node and the radio communication device based on the margin of the decoding A transmission module 225 module configured to sending information defining the reconfigured transmission properties to the wireless device or to sending information defining the reconfigured transmission properties to the wireless device.

A receiver module 226 configured to receive one or more further transport blocks from the receiving wireless device using the reconfigured transmission properties.

The modules are configured to execute the different aspects of the methods as described above.

Example Implementation of Downlink Transmission

Figure 6:
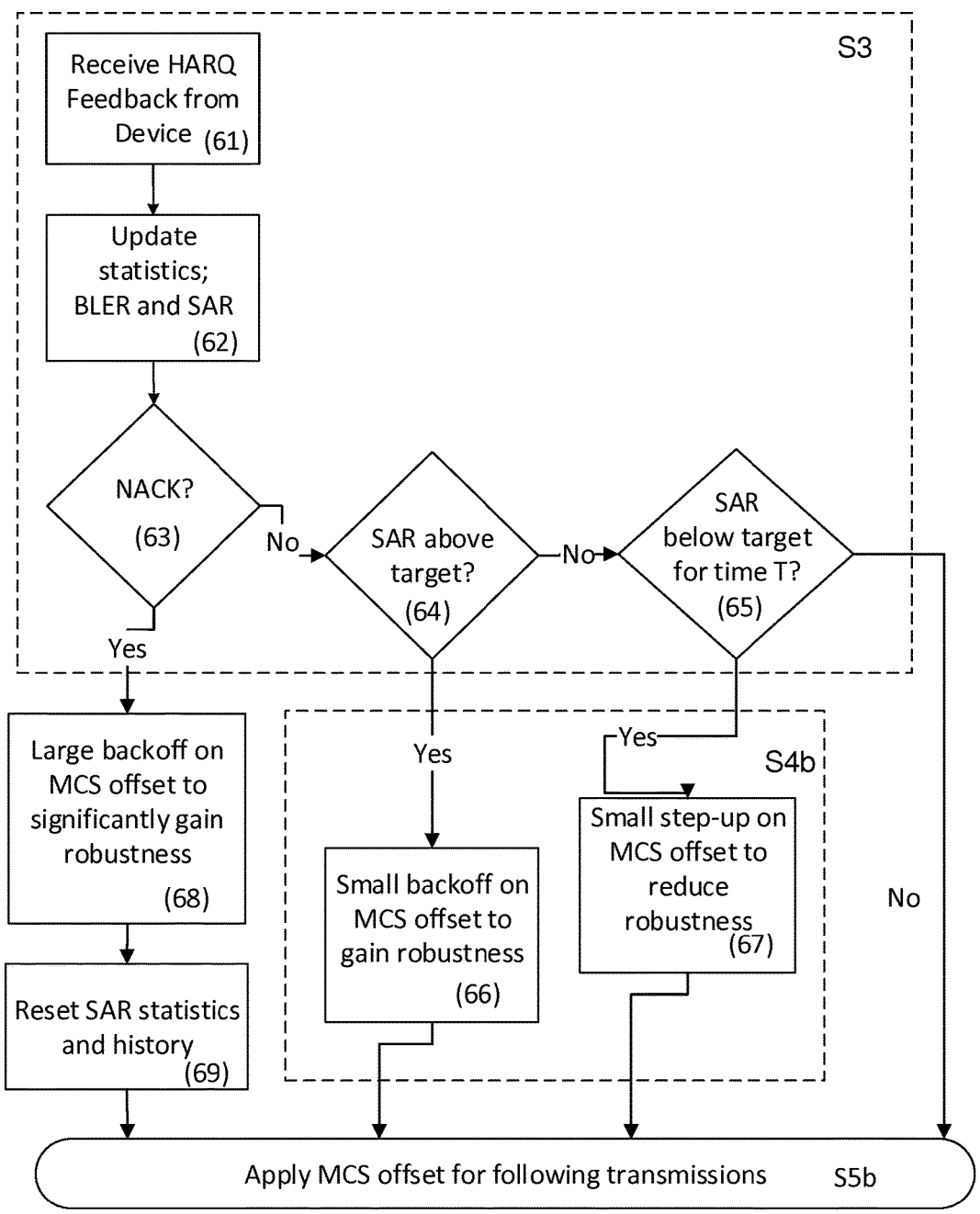
FIG. 6 is a flowchart showing exemplary processing steps of the disclosure on base station side in one example embodiment.
Figure 7:
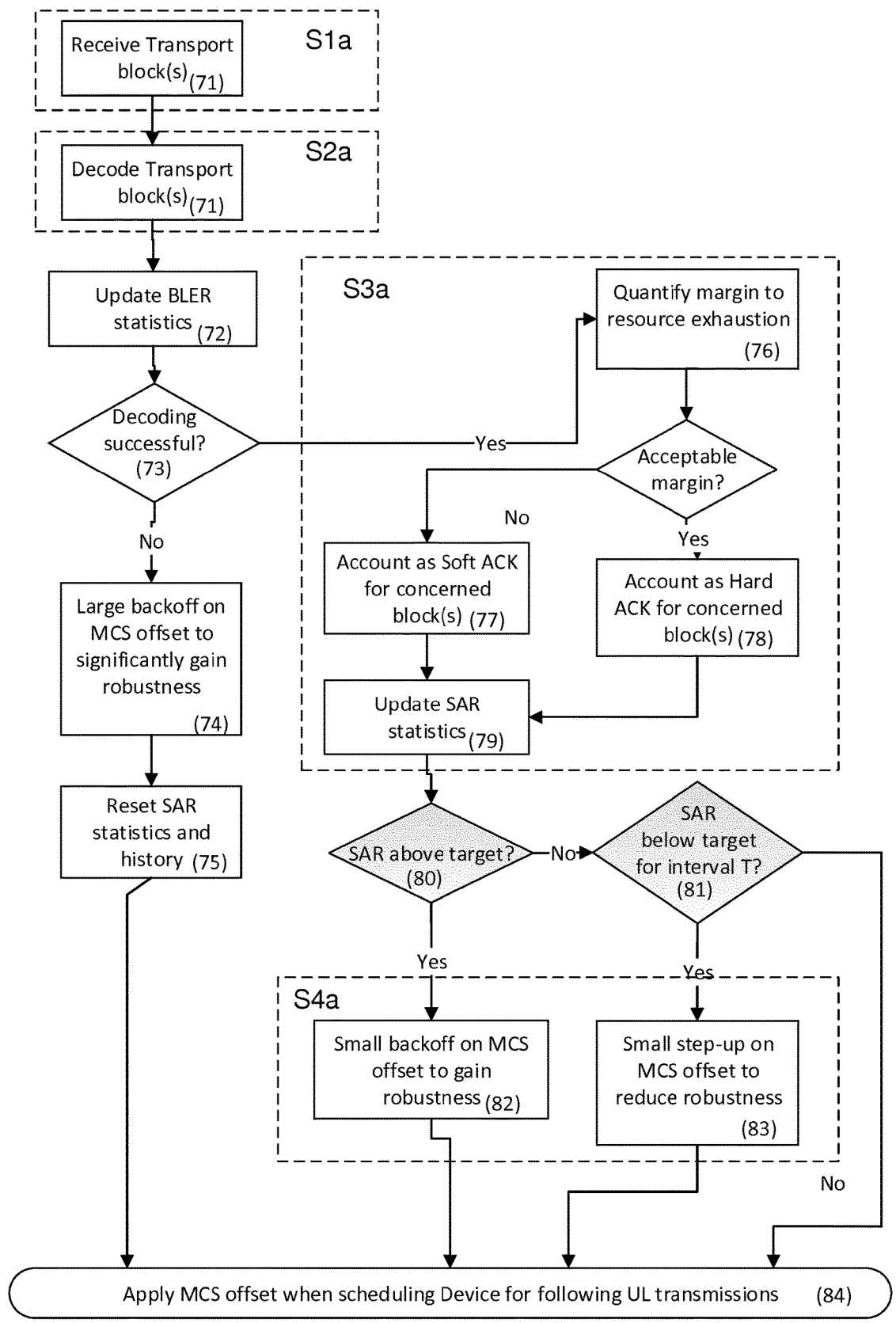
FIG. 7 is a flowchart showing exemplary processing steps in a wireless device in one example embodiment.

Exemplary processing steps of the disclosure on base station side for downlink transmission are shown in FIG. 6.

The base station receives 61 a HARQ indicator from the UE, and updates 62 the statistics and history for BLER and SAR. History may here for instance be a buffer containing the N most recent NACKs and ACKs (Soft or Hard the same) for BLER, and Soft ACKs and Hard ACKs for SAR. The buffered data is used for calculating the BLER and SAR, respectively.

In case a NACK is received 63;YES, the base station immediately adjusts the MCS offset for the UE to a safe setting providing considerably more robust transmission 68. It also resets the SAR statistics and clears the buffer used when calculating the SAR 69. In the following transmissions it applies the new MCS offset when determining which MCS to use for a particular CQI index reported by the UE. The modification may for instance corresponding to increasing the robustness to two or more levels higher than used when the transport block was sent to the UE.

If a Hard or Soft ACK was received 63;NO, the base station checks whether SAR is above the target (e.g. SAR 10%), and if so 64;YES it modifies 66 the MCS offset to achieve for instance the next higher level of robustness than used when the transport block was sent to the UE, and uses that MCS offset when determining the MCS for following transmissions. If the SAR is on or below target 64;NO, the base station checks how long time the SAR consistently has been below target. If this time exceeds some time T which may represent actual time, or TTIs for which Soft or Hard ACK have been received 65;YES, the transmissions have been more robust than intended for some time, and the base station reduces 67 the MCS offset to for instance to the next lower robustness level than used when the transport block was transmitted to the UE. The parameter value of T may be configured e.g. from 0 (instantaneous) and upwards, allowing tuning of how inert the system is regarding reduction of robustness. Steps 61-65 corresponds to step S3*b* and steps 66 and 67 corresponds to step S4*b* of FIG. 4.

It then applies the new MCS offset when determining the MCS to be used for following transmissions S5*b*.

If the SAR has not been below target long enough 65;NO, the base station uses the same MCS offset as used in previous transmission.

Note: In case the UE does not send ACK/NACK when expected the base station may count this as a NACK.

Example Implementation of Uplink Transmission

Exemplary processing steps of the invention on base station side for uplink, UL, reception and transmission are shown in 7.

The base station receives 71 a transport block from the UE and tries to decode it 71. This corresponds to step S1*a* and S2*a* in FIG. 3. The radio network node then updates 72 the UL BLER statistics based on whether the decoding was successful or not 73. In case the decoding failed 73;NO, the base station immediately adjusts 74 the UL MCS offset for the UE to a safe setting providing considerably more robust transmission. It also resets 75 the SAR statistics and clears the buffer used when calculating the SAR. In the following transmissions it applies the new MCS offset when determining which MCS to configure for the UE to use when transmitting on the uplink. The modification may for instance correspond to increasing the robustness to two or more levels higher than used by the UE for the transport block that was received.

The base station may, when determining the UL MCS to configure the UE with, take into account UL CRS measurements and/or SRS, and in case of e.g. TDD, also the DL CQI reported by the UE (reciprocity—essentially similar radio channel since the same frequency is used for uplink and downlink.)

If the on the other hand the decoding was successful 73;YES, the base station assesses whether there are sufficient margin compared to the capacity or budgeted capacity for the uplink decoding. If insufficient capacity 76;NO it sees the successful decoding as a Soft ACK 77, otherwise 76;NO as a Hard ACK 78. It then updates the SAR statistics and history 79. Steps 76 to 79 in principle corresponds to the step of obtaining S3*a* information indicative of a decoding margin of the decoding of the first transport block as described in FIG. 3*a*.

The base station checks whether SAR is above the target (e.g. SAR 5%), and if so 80;YES it modifies 82 the MCS offset to achieve for instance the next higher level of robustness than used when the transport block was sent by the UE, and uses that MCS offset when determining the MCS for following transmissions 84 on the uplink.

If the SAR is on or below target 80;NO, the base station checks how long time the SAR consistently has been below target. If this time exceeds some time T which may represent actual time, or TTIs for which Soft or Hard ACK have been received 81;YES, the UL transmissions have been more robust than intended for some time, and the base station reduces 83 the MCS offset to for instance to the next lower robustness level than used when the transport block was transmitted by the UE. The parameter value of T may be configured e.g. from 0 (instantaneous) and upwards, allowing tuning of how inert the system is regarding reduction of robustness. The modification of MCS corresponds to the reconfiguring of the transmission properties to be used for further transmissions from the wireless device, based on the decoding as discussed in FIG. 3.

It then applies the new MCS offset when determining the MCS to be used for following uplink transmissions 84.

If the SAR has not been below target long enough 81;NO, the base station configures the UE using the same MCS offset as in previous uplink transmission.

Note that T as well as the BLER and SAR history length may be different between downlink and uplink.

SAR Target May be Different Between Uplink and Downlink

The SAR statistics and the MCS offset may apply for all HARQ processes per uplink and downlink, respectively, or may apply for individual HARQ processes. If common statistics is used for the HARQ processes for either direction, some additional latency may have to be introduced from the point in time where the MCS is modified until it is assessed whether to increase the MCS further, since effects of a change cannot be observed before next transmission occurs.

Furthermore, different base stations may use different strategies on how to handle the case when the SAR statistics is reset.

Within the context of this disclosure, the terms "wireless terminal" or "wireless device" encompass any terminal which is able to communicate wirelessly with another device, as well as, optionally, with an access node of a wireless network) by transmitting and/or receiving wireless signals. Thus, the term "wireless terminal" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless nodes. Hence, whenever a "user equipment" or "UE" is referred to in this disclosure, this should be understood as encompassing any wireless terminal as defined above.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, of configuring transmission properties of transmissions between a radio network node and a wireless device, the method comprising:
    obtaining information indicative of a decoding margin of a successful decoding of a first transport block transmitted, using a set of transmission properties, between the radio network node and the wireless device, and
    reconfiguring the transmission properties to be used for further transmissions between the radio network node and the wireless device, based on the obtained information indicative of a decoding margin,
    wherein the method is performed in the radio network node.

2. The method of claim 1, wherein the reconfiguring comprises changing the robustness of transmissions of one or more further transport blocks between the radio network node and the wireless device, in relation to robustness of the transmission of the first transport block.

3. The method of claim 1, wherein the information indicative of a decoding margin comprises an indication of a share of a processing capacity of the radio network node or the wireless device, that was used for the reception and/or decoding of the first transport block.

4. The method of claim 1, wherein reconfiguring comprises selecting transmission properties corresponding to a robustness which is higher than the robustness of transmissions of the transmission of the first transport block, if the information indicative of a decoding margin is below a predefined level.

5. The method of claim 1, wherein reconfiguring comprises selecting transmission properties corresponding to a robustness which is lower than the robustness of transmissions of the transmission of the first transport block, if the information indicative of a decoding margin is above a predefined level.

6. The method of claim 1, comprising:
    calculating an accumulated decoding margin, representing the information indicative of a decoding margin of previous and present transport blocks transmitted, using the set of transmission properties, between the radio network node and the wireless device;
    wherein the reconfiguring is based on the accumulated decoding margin.

7. The method of claim 1, wherein the transmission properties comprises one or more of the following properties: Modulation and Coding Scheme, Radio Access Technology, Multiple Input Multiple Output transmission modes, Beam forming, Pre-coding Matrix and Transmission Power.

8. The method according to claim 1, wherein the transport block is transmitted from the wireless device to the radio network node, the method comprising:
    receiving the first transport block from the wireless device, the method comprises:
    decoding the first transport block;
    and wherein the reconfiguring comprises reconfiguring the transmission properties to be used for further transmissions from the wireless device, based on the information indicative of a decoding margin.

9. The method of claim 8, further comprising:
sending information defining the reconfigured transmission properties to the wireless device.

10. The method of claim 8, further comprising:
configuring, a set of transmission properties, to be used in the wireless device when transmitting to the radio network node.

11. The method of claim 8, further comprising:
receiving, one or more further transport blocks from the wireless device using the reconfigured transmission properties.

12. The method of claim 1, wherein the transport block is transmitted from the radio network node to the wireless device, the method comprising:
transmitting, using a set of transmission properties, the first transport block to a wireless device;
wherein the obtaining comprises receiving, from the wireless device, an acknowledgement confirming reception and successful decoding of the first transport block in the wireless device and information defining information indicative of a decoding margin of the decoding; and
wherein the reconfiguring comprises reconfiguring the transmission properties to be used for transmissions of one or more further transport blocks to the wireless device, based on the information indicative of a decoding margin.

13. The method of claim 12, comprising the step of:
transmitting, using the reconfigured transmission properties, one or more further transport blocks to the wireless device.

14. The method of claim 12, wherein the receiving comprises receiving information defining one of a plurality of possible ACK levels, wherein each level corresponds to information indicative of a decoding margin within a predefined range.

15. The method of claim 12, comprising the step of:
sending a request to enable reporting of information indicative of a decoding margin, to the wireless device.

16. The method of claim 12, comprising the step of:
receiving a request to enable reporting of information indicative of a decoding margin, from the wireless device.

17. A nontransitory computer readable medium comprising computer program code which, when executed in a programmable controller of a radio network node that is communicating with a wireless device, causes the radio network node to execute a method of configuring transmission properties, the method comprising:
obtaining information indicative of a decoding margin of a successful decoding of a first transport block transmitted, using a set of transmission properties, between the radio network node and the wireless device, and
reconfiguring the transmission properties to be used for further transmissions between the radio network node and the wireless device, based on the obtained information indicative of a decoding margin.

18. A radio network node comprising a radio communication interface and processing circuitry, wherein the processing circuitry is configured:
to obtain information indicative of a decoding margin of a successful decoding of a first transport block transmitted between the radio network node and a wireless device, and
to reconfigure transmission properties to be used for further transmissions between the radio network node and the wireless device based on the obtained information indicative of a decoding margin.

19. The radio network node of claim 18, wherein the radio network node is an eNodeB.

20. The radio network node of claim 18, wherein the processing circuitry is further configured to reconfigure the transmission properties by changing the robustness of transmissions of one or more further transport blocks between the radio network node and the wireless device, in relation to robustness of the transmission of the first transport block.

21. The radio network node of claim 18, wherein the information indicative of a decoding margin comprises an indication of a share of a processing capacity of the radio network node or the wireless device, that was used for the reception and/or decoding of the first transport block.

22. The radio network node of claim 18, wherein the processing circuitry is further configured to reconfigure the transmission properties by selecting transmission properties corresponding to a robustness which is higher than the robustness of transmissions of the transmission of the first transport block, if the information indicative of a decoding margin is below a predefined level.

23. The radio network node of claim 18, wherein the processing circuitry is further configured to reconfigure the transmission properties by selecting transmission properties corresponding to a robustness which is lower than the robustness of transmissions of the transmission of the first transport block, if the information indicative of a decoding margin is above a predefined level.

24. The radio network node of claim 18, wherein the processing circuitry is further configured to calculate an accumulated decoding margin, representing the information indicative of a decoding margin of previous and present transport blocks transmitted, using the set of transmission properties, between the radio network node and the wireless device;
wherein the reconfiguring is based on the accumulated decoding margin.

25. The radio network node of claim 18, wherein the transmission properties comprises one or more of the following properties: Modulation and Coding Scheme, Radio Access Technology, Multiple Input Multiple Output transmission modes, Beam forming, Pre-coding Matrix and Transmission Power.

26. The radio network node of claim 18, wherein the processing circuitry is configured to obtaining information indicative of a decoding margin of a successful decoding of a first transport block transmitted, to the radio network node from the wireless device and wherein the processing circuitry is configured:
to receive the first transport block from the a wireless device; wherein the first transport block is transmitted using a set of transmission properties; and
to decode the first transport block;
and wherein the processing circuitry is configured to reconfigure the transmission properties to be used for further transmissions from the wireless device, based on the information indicative of a decoding margin.

27. The radio network node of claim 18, wherein the processing circuitry is configured
to send information defining the reconfigured transmission properties to the wireless device.

28. The radio network node of claim 18, wherein the processing circuitry is configured
to configure, a set of transmission properties, to be used in the wireless device when transmitting to the radio network node.

29. The radio network node of claim 18, wherein the processing circuitry is configured
to receive, one or more further transport blocks from the wireless device using the reconfigured transmission properties.

30. The radio network node of claim 18, wherein the processing circuitry is configured to obtain information indicative of a decoding margin of a successful decoding of a first transport block transmitted, from the radio network node to the wireless device and wherein the processing circuitry is configured:
to transmit, using a set of transmission properties, the first transport block to a wireless device;
wherein the processing circuitry is configured to obtain, from the wireless device, an acknowledgement confirming reception and successful decoding of the first transport block in the wireless device and information defining information indicative of a decoding margin of the decoding; and
wherein the processing circuitry is configured to reconfigure the transmission properties to be used for transmissions of one or more further transport blocks to the wireless device, based on the information indicative of a decoding margin.

31. The radio network node of claim 30, wherein the processing circuitry is configured:
to transmit, using the reconfigured transmission properties, one or more further transport blocks to the wireless device.

32. The radio network node of claim 30, wherein the receiving comprises receiving information defining one of a plurality of possible ACK levels, wherein each level corresponds to information indicative of a decoding margin within a pre-defined range.

33. The radio network node of claim 30, wherein the processing circuitry is configured:
to send a request to enable reporting of information indicative of a decoding margin, to the wireless device.

34. The radio network node of claim 30, wherein the processing circuitry is configured:
to receive a request to enable reporting of information indicative of a decoding margin, from the wireless device.

* * * * *